United States Patent
Park et al.

(10) Patent No.: US 9,428,607 B2
(45) Date of Patent: Aug. 30, 2016

(54) POLYLACTIC ACID-POLYALKYLENE GLYCOL COPOLYMER WITH FAST CRYSTALLIZATION RATE AND COMPOSITION COMPRISING THE SAME

(71) Applicant: SAMSUNG TOTAL PETROCHEMICALS CO., LTD., Chungcheongnam-do (KR)

(72) Inventors: Steve Park, Gyeonggi-do (KR); Do Hoon Lee, Chungcheongnam-do (KR); Sung Kyo Jung, Gangwon-do (KR); Chang Hyun Choi, Seoul (KR); Wan Keun Kim, Chungcheongnam-do (KR)

(73) Assignee: Hanwha Total Petrochemical Co., Ltd., Chungcheongnam-do (KR)

( * ) Notice: Subject to any disclaimer, the term of this patent is extended or adjusted under 35 U.S.C. 154(b) by 0 days.

(21) Appl. No.: 14/043,709

(22) Filed: Oct. 1, 2013

(65) Prior Publication Data

US 2014/0100318 A1 Apr. 10, 2014

(30) Foreign Application Priority Data

Oct. 4, 2012 (KR) .................. 10-2012-0110029

(51) Int. Cl.
| | | |
|---|---|---|
| *C08G 63/66* | (2006.01) | |
| *C08K 3/34* | (2006.01) | |
| *C08G 81/00* | (2006.01) | |
| *C08G 63/668* | (2006.01) | |
| *C08K 5/00* | (2006.01) | |

(52) U.S. Cl.
CPC .............. *C08G 63/668* (2013.01); *C08G 81/00* (2013.01); *C08K 3/346* (2013.01); *C08K 5/0083* (2013.01)

(58) Field of Classification Search
CPC ..... G08G 67/04; G08G 63/08; G08G 63/664; G08G 63/668; G08G 65/48; G08G 63/912; C08L 71/00; C08L 71/02; C08L 67/04
See application file for complete search history.

(56) References Cited

U.S. PATENT DOCUMENTS 5,202,413 A * 4/1993 Spinu .......................... 528/354
5,624,987 A * 4/1997 Brink ................... C08L 67/02
                                                                524/290

(Continued)

FOREIGN PATENT DOCUMENTS

| JP | 2009001637 A * | 1/2009 |
| JP | 2010-106111 | 5/2010 |
| KR | 10-2012-0035729 | 4/2012 |

OTHER PUBLICATIONS

Machine translated English equivalent of JP 2009-1637 (Jan. 2009, 14 pages).*

(Continued)

Primary Examiner — Brieann R Fink
(74) Attorney, Agent, or Firm — Arnold & Porter LLP

(57) ABSTRACT

The provided are a polylactic acid-polyalkylene glycol copolymer and a composition comprising the same which have excellent crystallization rate, wherein the polylactic acid-polyalkylene glycol copolymer is prepared by melt-reacting polylactic acid with polyalkylene glycol of which one end group is substituted with a functional group and has improved eco-friendliness, injection moldability, and excellent heat resistance which makes it to be suitably applied to various molded articles requiring great heat resistance, such as disposables, kitchen utensils and containers, electric-electronic parts and automobile parts.

9 Claims, 1 Drawing Sheet

(56) References Cited

U.S. PATENT DOCUMENTS

| | | | |
|---|---|---|---|
| 7,351,785 B2 | 4/2008 | Matsumoto et al. | |
| 8,030,382 B2* | 10/2011 | Endo | C08K 5/29 523/124 |
| 2005/0154148 A1* | 7/2005 | Nakamichi et al. | 525/450 |
| 2010/0210756 A1* | 8/2010 | Takenaka et al. | 523/124 |

OTHER PUBLICATIONS

Cho (synthesis and characterization of poly(ethylene glycol) grafted poly(L-lactide). Macromol. Rapid Commun. 1999, 20, 598-601).*

Lai (The Effect of Ionic Interaction on the Miscibility and Crystallization Behaviors of Poly(ethylene glycol)/Poly(L-lactic acid) Blends. Journal of Applied Polymer Science. 2008, 110, 3616-3623).*

Fischer et al., "Investigation of the structure of solution grown crystals of lactide copolymers by means of chemical reactions," *Kolloid-Z.u. Z. Polymere* 251:980-990 (1973).

Li et al., "Effect of nucleation and plasticizatio on the crystallization of poly(lactic acid)," *Polymer* 48:6855-6866 (2007).

Wang et al., "Accelerating the crystallization of poly (lactic acid)," *Society of Plastics Engineers*, DOI:10.1002/spepro.002983 (2010).

* cited by examiner

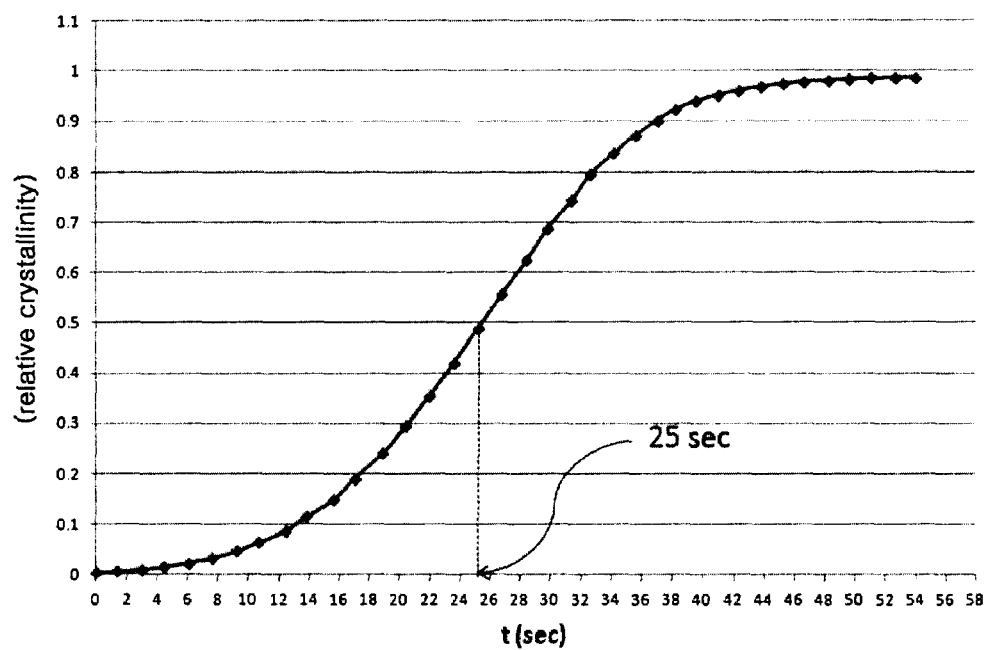

POLYLACTIC ACID-POLYALKYLENE GLYCOL COPOLYMER WITH FAST CRYSTALLIZATION RATE AND COMPOSITION COMPRISING THE SAME

CROSS-REFERENCE TO RELATED APPLICATION

The present application claims priority to Korean Patent Application No. 10-2012-0110029, filed Oct. 4, 2012, which application is incorporated herein by reference in its entirety.

TECHNICAL FIELD

The present invention relates to a polylactic acid-polyalkylene glycol copolymer and a composition comprising the same, specifically, to a polylactic acid-polyalkylene glycol copolymer having an excellent crystallization rate, processability, and heat resistance, and a composition comprising the same.

BACKGROUND ART

Many plastic materials derived from petroleum have considerably various applications from daily necessaries to aerospace materials, as the mechanical properties and thermal stability thereof can be easily controlled. However, when plastic wastes are buried in a landfill, these are not decomposed but accumulated in the environment. In the meantime, when such plastic wastes are incinerated, harmful by-products and a great amount of carbon dioxide are generated, thereby promoting environmental contamination as well as global warming.

With an increasing concern on the environmental problems, researches on eco-friendly plastics such as plastics made of plant resources or biodegradable plastics which are decomposed by microorganisms have been increasingly carried out. As for the eco-friendly plastics under consideration, there are polyhydroxy butylate, polycaprolactone, polylactic acid, aliphatic polyesters, biopolyethylene, etc., and among them, polylactic acid has been most widely and aggressively investigated and appreciated for having an excellent availability in a commercial point of view.

The polylactic acid is a relatively rigid polymer with a flexural modulus as much as that of general plastics, but poor heat resistance and molding properties. Owing to such defects, it has limited applications where require high heat resistance. In this respect, studies for complementing the properties of polylactic acid by mixing it with petroleum-derived plastics such as polypropylene or polycarbonate, etc. have been being made, however in most of such cases, the polylactic acid content cannot be over 50 weight percent (wt %) and thus it is not suitably referred as genuine eco-friendly plastic materials.

For ensuring high heat resistance and molding properties of the polylactic acid, there is a method for improving the crystallinity degree of the polymer. Currently, for improving the crystallinity degree of the polylactic acid, it is general to increase the temperature of a mold for injection molding and to lengthen the cooling time in the mold, however this method has a disadvantage which is a prolonged molding cycle. For reducing the cooling time, a method for promoting crystallization rate (hereinafter, also referred as a crystallinity degree) by adding a seeding agent for crystallization (i.e. nucleating agent) is known in the art. A nucleating agent promotes the growth of a crystal by being served as a primary crystal nucleus of a crystalline polymer, makes the crystal size finer, and increases the crystallization rate. As for a nucleating agent used for a polylactic acid resin, inorganic particles consisting of talc and/or boron nitride, amide compounds, sorbitol derivatives, metal salt of phosphate ester, etc. are known, however these do not have enough effects despite a high price and thus the utility value is not good in practical terms.

The non-patent references 1 and 2 suggest another method for increasing the crystallinity degree and the crystallization rate of a polylactic acid by adding a nucleating agent and a plasticizer. The above method is to improve polymer chain mobility and thus to increase a crystallization rate, by adding a certain amount of a plasticizer (anti-plasticization), unlike a method comprised of adding an excess amount of a plasticizer for imparting flexibility to a polymer. More specifically, it significantly enhanced the crystallization rate of a polylactic acid by mixing polylactic acid, talc, and a polyethylene glycol, however its crystallization rate was not sufficiently fast enough. Further, even though a polyethylene glycol is used at the amount of 5 wt % or less, it has a problem that bleed-out to the surface occurs so much that injection molding cannot be easily carried out.

For reducing bleed-out of a polyethylene glycol to the surface, Korean patent laid-open publication No. 10-2012-0035729, U.S. Pat. No. 7,351,785, etc. suggest a method to produce a polylactic acid-polyethylene glycol copolymer by adding a polyethylene glycol during polymerization of a polylactic acid. However, when forming a copolymer through polymerization as in these methods, the reaction time is long; an organic solvent that is harmful to a human body should be used at a great amount; and the reaction conditions should be carefully and finely adjusted cumbersomely. Further, these methods do not mention any of the crystallinity degree and the crystallization rate at all, and their object is to impart flexibility in the preparation of a polylactic acid film, and these have a problem that the crystallinity degree is lowered owing to the use of a high content of polyethylene glycol.

SUMMARY OF THE INVENTION

The present invention has been designed to solve the problems of the conventional techniques as mentioned above, and the object of the present invention is to provide polylactic acid-polyethylene glycol copolymer obtained from an extrusion-reaction of polylactic acid with a polyethylene glycol of which end group is substituted with a functional group in a short time, without using an organic solvent that is harmful to human health.

Moreover, the object of the present invention is to provide a composition comprising a polylactic acid-polyethylene glycol copolymer and a nucleating agent, which has high crystallinity degree, rapid crystallization rate, and excellent injection molding property.

BRIEF DESCRIPTION OF THE DRAWINGS

FIG. 1 is a representative plot showing the crystallization rate of the composition according to Example 4 measured by using a polarization microscope. As shown in FIG. 1, the crystallinity degree varied over time was represented as a numerical value, and $t_{1/2}$ was defined as the time when the crystallinity degree is 50%.

DETAILED DESCRIPTION OF THE INVENTION

The polylactic acid-polyalkylene glycol copolymer according to the present invention can be prepared by reacting polylactic acid with polyalkylene glycol, wherein the polylactic acid-polyalkylene glycol copolymer comprises 0.05-25.0 wt % of the polyalkylene glycol.

In the polylactic acid-polyalkylene glycol copolymer according to the present invention, as for the polylactic acid, either L-polylactic acid or D-polylactic acid may be used.

The weight-average molecular weight of the polylactic acid is preferably 10,000 grams/mole (g/mol) or more; when it is less than 10,000 g/mol, the processability becomes lowered and the injection molded product obtained therefrom has poor physical properties.

In the polylactic acid-polyalkylene glycol copolymer according to the present invention, the polyalkylene glycol is a polyalkylene glycol of which end group is substituted with amine, and may be selected from the group consisting of those represented by the following formulas 1, 2 and 3:

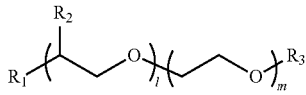

[Formula 1]

wherein, $R_1$ is an amine, an epoxy, an isocyanate, an anhydride, a carbodiimide, or an aziridine; $R_2$ is hydrogen, a $C_1$-$C_8$ alkyl or alkenyl group, or a $C_6$-$C_8$ aryl group; $R_3$ is a $C_1$-$C_8$ alkyl or alkenyl group, or a $C_6$-$C_8$ aryl group; l is an integer of 0-200; and m is an integer of 0-200, wherein the position of l and m may be interchanged;

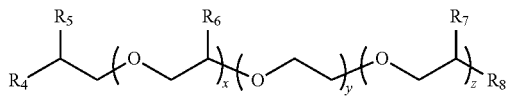

[Formula 2]

wherein, $R_4$ and $R_8$ are independently an amine, an epoxy, an isocyanate, an anhydride, a carbodiimide, or an aziridine; $R_5$ to $R_7$ are independently hydrogen, or a $C_1$-$C_8$ alkyl or alkenyl group, or a $C_6$-$C_8$ aryl group; x is an integer of 0-100; y is an integer of 1-200; and z is an integer of 0-100; and

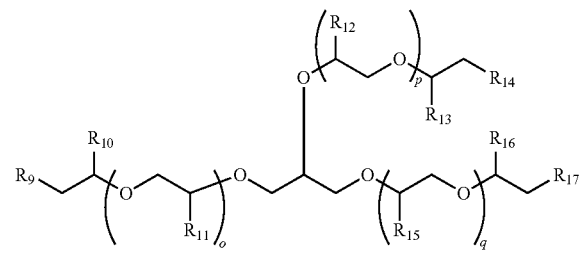

[Formula 3]

wherein, $R_9$, $R_{14}$ and $R_{17}$ are independently an amine, an epoxy, an isocyanate, an anhydride, a carbodiimide, or an aziridine; $R_{10}$ to $R_{13}$, $R_{15}$ and $R_{16}$ are hydrogen, or a $C_1$-$C_8$ alkyl or alkenyl group, or a $C_6$-$C_8$ aryl group; o is an integer of 1-200; p is an integer of 1-200; and q is an integer of 1-200.

In the polylactic acid-polyalkylene glycol copolymer according to the present invention, the amount of the polyalkylene glycol is 0.05-25.0 wt %, preferably 1-20.0 wt %, more preferably 2-10.0 wt %, based on the total weight of the copolymer, wherein when it is less than 0.05 wt %, the crystallization rate of the copolymer is lowered undesirably, and when it is more than 25.0 wt %, the rigidity of the polylactic acid becomes lowered rather than the increase of the crystallization rate, and bleed-out of the unreacted polyalkylene glycol to the surface is observed, undesirably.

The polylactic acid-polyalkylene glycol copolymer according to the present invention may be prepared by melt-reacting the polylactic acid and the polyalkylene glycol, wherein during the melt-reaction of the polylactic acid and the polyalkylene glycol, the carboxyl group or hydroxyl group of the polylactic acid forms a chemical bond with amine, epoxy or isocyanate group of the polyalkylene glycol so as to form the copolymer.

The temperature for said melt-reaction is 160-250° C., preferably 170-220° C., and more preferably 180-200° C. wherein the melt-reaction temperature is less than 160° C., the polylactic acid resin does not melt so that the flowability becomes lowered and a reaction forming amide bond becomes slow, undesirably, when it is more than 250° C., the polylactic acid decomposition is accelerated, the crystallization rate of the resulted resin is lowered, and yellowing becomes strong, disadvantageously.

The polylactic acid-polyalkylene glycol copolymer according to the present invention does not involve any organic solvent hazardous to human health, wherein 90 wt % or more of the copolymer is consisted of biodegradable material, thereby being highly eco-friendly.

The polylactic acid-polyalkylene glycol copolymer according to the present invention is characterized by being suitably and easily applied to injection molding, and providing an injection molded product having excellent heat resistance. More particularly, a cycle time in carrying out the injection molding is 10 times or more faster than the injection molding for the general polylactic acid at 110° C., the heat deformation temperature of the injected product is 70° C. or more, preferably 100° C. or more, and more preferably 115° C. or more.

The polylactic acid-polyalkylene glycol copolymer can be used in a preparation of molded products which are significantly required heat resistance, for example, such as vehicle parts, electric and electronic parts, mechanical parts, office equipment such as computer or the like.

The polylactic acid-polyalkylene glycol copolymer composition according to the present invention is characterized by comprising 0.01-5.0 parts by weight of a nucleating agent based on 100 parts by weight of the polylactic acid-polyalkylene glycol copolymer.

The specific examples of such nucleating agent may be at least one selected from a group consisting of polyglycolide, benzohydrazide derivatives, talc, sodium stearate, calcium lactate, ethylene bis(12-hydroxystearylamide), terephthalimide derivatives (NU-100), 1,4-yclohexanedicarboxylic dianilide, and zinc phenyl phosphate.

The amount of a nucleating agent used is preferably 0.01-5.0 parts by weight based on 100 parts by weight of the polylactic acid-polyalkylene glycol copolymer, wherein when the amount is 0.01 parts by weight or less, the crystallization rate is not fast enough, undesirably, and when it is more than 5 parts by weight, the nucleating agent becomes saturated state, and thus the crystallization rate does not become faster any more, thereby being undesirable in economic terms.

The polylactic acid-polyalkylene glycol copolymer composition according to the present invention may be prepared by blending a nucleating agent during melt-reacting the polylactic acid and the polyalkylene glycol. At this time, conventional additives, for example a general lubricant, inorganic particles, a thermo-stabilizing agent, an antioxidant, etc., other than the nucleating agent may be further blended thereto.

The polylactic acid-polyalkylene glycol copolymer composition according to the present invention may have higher crystallinity degree and faster crystallization rate as compared to the general polylactic acid. Specifically, the crystallinity degree is 40% or more, and when inducing crystal formation at 110° C., the crystallization rate ($t_{1/2}$) is preferably 15-30 seconds. The crystallinity degree is a value obtained by comparing $\Delta H_m$ that is a calorie found at a peak melting point of 150-180° C. during the course of elevating the temperature to 200° C. at a rate of 10° C./min by using a differential scanning calorimetry (DSC) with $\Delta H°_m$, a calculated calorie at a melting point of a polylactic acid. Crystallization rate was measured by using a polarized microscope and light diode array. Specifically, the resin composition was melted at 200° C., then spread on a slide glass to form a thin film and covered by a cover glass. This slide glass having melted resin composition was placed on a hot plate preheated to 110° C., and observed by using a polarized microscope to investigate crystallization rate of the resin composition. At this stage, the crystallization rate was determined based on the light intensity which was deduced depending on the crystallization of the resin composition occurred by transmitting polarized He—Ne laser.

INDUSTRIAL AVAILABILITY

The polylactic acid-polyalkylene glycol copolymer prepared according to the present invention and a composition comprising the same have a rapid crystallization rate, a high crystallinity degree and heat resistance, and excellent injection moldability, thereby being suitably used in various applications.

Embodiments to Practice the Invention

Hereinafter, the present invention is further illustrated by way of the following examples and comparative examples. However, these are only intended to exemplify the present inventions and not to limit the scope of the present invention.

Examples and Comparative Examples

The materials, preparation method, injection method and determination method of physical properties used in the examples and the comparative examples are described as follows.

(1) Polylactic acid resin

As L-polylactic acid resin, 4032D manufactured by NatureWorks LLC was used.

(2) Polyalkylene glycol

As polyalkylene glycol, one of which ends has been modified with an amine, manufactured by Du Pont, Huntsman, Lonza, Basf, Aldrich and the like was used.

(3) Preparation method

Polylactic acid, polyalkylene glycol, and optionally a nucleating agent were melt-kneaded in a twin-screw extruder. At this time, the polyalkylene glycol was injected to an extruder at the extrusion temperature ranged of 180~200° C. by using a liquid feeder. After melt-kneading, the resultant was pelletized using a pelletizer.

(4) Injection molding method

After drying the pellets prepared by the above method described in (3) at 80° C. for 4 hours, they were injection molded through an injection molder, of which a cylinder temperature was set at 200° C.; a mold temperature was set at 110° C.; and molding cycle was set for 60 seconds, thereby obtaining injection molded test specimen of ASTM4.

(5) Heat deformation temperature(HDT)

HDT was measured according to ASTM D648.

(6) Injection molding readiness

After drying the pellets obtained from the extrusion reaction at 110° C. for 2 hours, when the bleed-out of the unreacted polyalkylene glycol to the surface did not occur and was able to be injection-molded, it was estimated as "O" (excellent); although the bleed-out did not occur, if injection molding cycle was 1 minute or more, it was estimated as "A" (good); and when the bleed-out occurred so much that the injection molding was not possible, it was estimated as "X" (bad).

(7) Calorie determination

The resin composition was melt at 200° C. for 3 minutes by using a differential scanning calorimeter (DSC), and then the temperature was reduced to room temperature (23° C.) by the rate of 20° C./min to measure $T_c$ and $\Delta H_c$. Again, the temperature was raised to 200° C. by the rate of 10° C./min to measure $T_m$ and $\Delta H_m$.

(8) Determination of crystallinity half-life, i.e. time taken for reaching to 50% crystallinity ($t_{1/2}$; crystallization rate)

After melting the resin composition at 200° C., it was spread over a slide glass to form a thin film and covered by a cover glass. The slide glass was placed on a hot plate (Linkam Scientific Instruments Ltd.) preheated to 110° C., and then the crystallization rate of the resin composition was observed by using a polarized microscope (Olympus BX51). Particularly, the crystallinity degree was determined based on the light intensity which was deduced depending on the crystallization of the resin composition occurred by transmitting polarized He—Ne laser with wavelength of 632.8 nanometers (nm) to the film (38-channel photodiode array from Hamamastu Photonics Co.). The crystallinity degree over time (relative crystallinity, $\chi_c$) was calculated by using the following equation, and the calculated value was marked on a plot of $\chi_c$ vs time (second), wherein $t_{1/2}$ was defined as the time when $\chi_c$ is 0.5.

$$\chi_c = \frac{I(t) = I(0)}{I_\infty - I(0)} \qquad \text{[Equation 1]}$$

wherein, I(t) is light intensity at time t; I(0) is light intensity before crystallization of a resin starts; and $I_\infty$ is light intensity when crystallization is completed.

(9) Calculation of crystallinity degree

Crystallinity degree was calculated by using the following equation 2.

$$\text{Crystallinity degree (\%)} = \frac{\Delta H_m}{\Delta H_m^0} \times 100\% \quad \text{[Equation 2]}$$

wherein, $\Delta H_m$ is a measured calorie value when melting the resin, and $\Delta H^0_m$ is a calculated calorie value when melting the polylactic acid resin, which is 93.1 J/g, based on the report in the non-patent reference 3.

Examples 1-7 and Comparative Examples 1-6

The physical properties of the compositions according to Examples 1 to 4 and Comparative examples 1 to 4 are represented in the following Table 1, and the physical properties of the compositions according to Examples 5 to 7 and Comparative example 5 and 6 are represented in the following Table 2, respectively.

Examples 1 to 4 and Comparative examples 1 to 4 were carried out by mixing each component according to the composition provided in the following Table 1, and melt-kneading the mixture in a twin-screw extruder at 190° C. to produce pellets through extrusion. The pellet specimens were dried at 80° C. for 4 hours, then injection molded, while maintaining the temperature of injection molding at 110° C., and allowed to stand at room temperature for 24 hours. Then the physical properties of the specimens were measured as described below and the results were represented in the following Table 1.

For measuring the physical properties of the compositions of Examples 5 to 7 and Comparative example 5 and 6 according to Table 2, specimens were prepared by the method described in Examples 1 to 4 except the composition was different from Table 1. Then, physical properties of the prepared specimen were measured and the results were represented in the following Table 2.

As represented in the above Table 1, Examples 1 and 2 show high crystallinity degree and rapid crystallization rate($t_{1/2}$), and no bleed-out of unreacted polyalkylene glycol to the surface, thereby facilitated the injection molding. In Examples 1 and 2, the heat deformation temperature was measured to be 78° C. or more, which is about 20° C. higher than normal heat deformation temperature of a general polylactic acid, which is 56° C.

Further, reviewing Examples 3 and 4 which were prepared by adding a nucleating agent to the copolymers of Examples 1 and 2, it was found that the crystallization rate was clearly reduced and the heat deformation temperature was also increased to 110° C. or more. In contrast, Comparative example 1, not using a polyalkylene glycol, showed low crystallization rate, thereby injection molding was not easy to be performed. In Comparative example 2, although it was intended to control the crystallization rate by adding only nucleating agent without using polyalkylene glycol, it only made an improvement in the crystallinity degree of the composition, and failed to make an improvement in the heat deformation temperature and the crystallization rate. Moreover, when general polyalkylene glycol of which end group was a hydroxyl group as in Comparative examples 3 and 4 was used, the crystallinity degree of the polylactic acid composition was improved by cold crystallization during DSC analysis. However, the crystallization rate was not fast enough and the bleed-out of the unreacted polyalkylene glycol to the surface during the drying step after the extrusion process occurred so great that the injection molding itself was impossible.

TABLE 1

| | | | Examples | | | | Comparative examples | | | |
|---|---|---|---|---|---|---|---|---|---|---|
| | | | 1 | 2 | 3 | 4 | 1 | 2 | 3 | 4 |
| Composition (parts by weight) | PLA | A[1] | 90 | 90 | 90 | 90 | 100 | 100 | 90 | 90 |
| | Polyalkylene glycol | B-1[2] | 10 | — | 10 | — | — | — | — | — |
| | | B-2[3] | — | 10 | — | 10 | — | — | — | — |
| | | B-3[4] | — | — | — | — | — | — | 10 | 10 |
| | Crystallization nucleating agent[5] | C | — | — | 1 | 1 | — | 1 | — | 1 |
| Physical Properties | HDT (° C.) | | 78 | 80 | 115 | 110 | 56 | 58 | — | — |
| | $T_m$ (° C.) | | 167 | 164 | 164 | 162 | 151 | 168 | 164 | 161 |
| | $\Delta H_m$ (J/g) | | 43 | 38 | 41 | 39 | 23 | 38 | 40 | 41 |
| | $T_c$ (° C.) | | 85 | 100 | 102 | 102 | — | 96 | 87 | 89 |
| | $\Delta H_c$ (J/g) | | 9 | 19 | 32 | 31 | — | 7 | 2 | 12 |
| | $T_{cc}$ (° C.) | | 87 | 87 | — | — | 120 | 97 | 85 | 88 |
| | $\Delta H_{cc}$ (J/g) | | 19 | 5 | — | — | 22 | 23 | 31 | 15 |
| | Crystallinity degree (%) | | 46 | 41 | 44 | 42 | 25 | 41 | 43 | 44 |
| | $t_{1/2}$ (sec) | | 75 | 90 | 18 | 25 | ≥2300 | ≥1500 | 300 | 120 |
| | Injection readiness | | ○ | ○ | ○ | ○ | Δ | Δ | X | X |

Note

[1] A: polylactic acid which has a commercial product name of LLC 4032D, available from NatureWorks

[2] B-1: Polyalkylene glycol, in which one of end groups has been substituted with amine, It has a weight-average molecular weight of 2000 g/mol and a commercial product name of JEFFAMINE ® M-2070, available from Huntsman Corporation.

[3] B-2: Polyalkylene glycol, in which both of end groups have been substituted with amine. It has a weight-average molecular weight of 2000 g/mol. Commercial product name of JEFFAMINE ® ED-2003, available from Huntsman Corporation.

[4] B-3: Polyethylene glycol having a weight-average molecular weight of 400 g/mol, without any modification, available from Aldrich.

[5] C: Talc having particle size of 5-6 μm. Product name is KR8500, available from KOCH Ltd.

TABLE 2

|  |  |  | Examples | | | Comparative examples | |
|---|---|---|---|---|---|---|---|
|  |  |  | 5 | 6 | 7 | 5 | 6 |
| Composition (parts by weight) | PLA | A[1)] | 95 | 80 | 75 | 70 | 60 |
|  | Polyalkylene glycol | B-1[2)] | 5 | 20 | 25 | 30 | 40 |
|  | Crystallization nucleating agent | C[3)] | 1 | 1 | 1 | 1 | 1 |
| Physical Properties | HDT (° C.) | | 119 | 116 | 117 | 90 | — |
|  | $T_m$ (° C.) | | 166 | 164 | 163 | 161 | 159 |
|  | $\Delta H_m$ (J/g) | | 41 | 40 | 38 | 30 | 22 |
|  | $T_c$ (° C.) | | 105 | 106 | 104 | 100 | 102 |
|  | $\Delta H_c$ (J/g) | | 34 | 33 | 32 | 24 | 18 |
|  | $T_{cc}$ (° C.) | | — | — | — | — | — |
|  | $\Delta H_{cc}$ (J/g) | | — | — | — | — | — |
|  | Crystallinity degree (%) | | 44 | 43 | 41 | 32 | 24 |
|  | $t_{1/2}$ (sec) | | 18 | 19 | 17 | 20 | 22 |
|  | Injection readiness | | ○ | ○ | ○ | Δ | X |

Note
[1)]A: Polylactic acid which has a commercial product name of LLC 4032D, available from Nature Works.
[2)]B-1: Polyalkylene glycol of which one end group has been substituted with amine. It has a weight-average molecular weight of 2000 g/mol and a commercial product name of EFFAMINE ® M-2070, available from Huntsman Corporation
[3)]C: Talc having particle size of 5-6 μm, KR8500, available from KOCH ltd.

Above table 2 shows the physical properties of compositions having various contents of polyalkylene glycol of which one end group is substituted with amine. When the amount of polyalkylene glycol is in the range of 5-25.0 wt % as in Examples 5-7, it exhibits a high crystallinity degree, fast crystallization rate, and high heat deformation temperature. However, when the polyalkylene glycol is added at the amount of 30 wt % or more as in Comparative examples 3 and 4, although the crystallization rate is maintained to 100 seconds or less owing to the plasticizing action of polyalkylene glycol, the crystallinity degree is certainly lowered and the bleed-out of the unreacted polyalkylene glycol to the surface is observed before and after the injection molding.

What is claimed is:

1. A polylactic acid-polyalkylene glycol copolymer, wherein said polylactic acid-polyalkylene glycol copolymer is prepared by melt-reacting polylactic acid with a polyalkylene glycol of Formula 1,

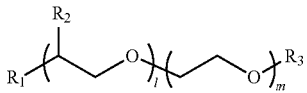

Formula 1 wherein, $R_1$ is an amine, an isocyanate, a carbodiimide, or an aziridine; $R_2$ is hydrogen, a $C_1$-$C_8$ alkyl or alkenyl group, or a $C_6$-$C_8$ aryl group; $R_3$ is a $C_1$-$C_8$ alkyl or alkenyl group, or a $C_6$-$C_8$ aryl group; l is an integer from 0-200; and m is an integer from 0-200;
wherein said polylactic acid-polyalkylene glycol copolymer comprises 0.05-25.0 weight percent (wt %) of said polyalkylene glycol of Formula 1, and has a heat deformation temperature of 70° C. or more.

2. The polylactic acid-polyalkylene glycol copolymer according to claim 1, wherein said polylactic acid is L-polylactic acid or D-polylactic acid.

3. A composition comprising 0.01-5.0 parts by weight of a nucleating agent, based on 100 parts by weight of the polylactic acid-polyalkylene glycol copolymer according to claim 1.

4. A composition comprising 0.01-5.0 parts by weight of a nucleating agent, based on 100 parts by weight of the polylactic acid-polyalkylene glycol copolymer according to claim 2.

5. The composition according to claim 3, wherein said nucleating agent is at least one selected from the group consisting of a benzohydrazide derivative, talc, sodium stearate, calcium lactate, ethylene bis(12-hydroxystearylamide), a terephthalimide derivative, 1,4-cyclohexanedicarboxylic dianilide, and zinc phenyl phosphate.

6. The composition according to claim 4, wherein said nucleating agent is at least one selected from the group consisting of a benzohydrazide derivative, talc, sodium stearate, calcium lactate, ethylene bis(12-hydroxystearylamide), a terephthalimide derivative, 1,4-cyclohexanedicarboxylic dianilide, and zinc phenyl phosphate.

7. The composition according to claim 3, having a crystallinity degree of 40% or more, and a crystallization rate ($t_{1/2}$) of 15-30 seconds, when crystallization is induced at 110° C.

8. The composition according to claim 4, having a crystallinity degree of 40% or more, and a crystallization rate ($t_{1/2}$) of 15-30 seconds, when crystallization is induced at 110° C.

9. The polylactic acid-polyalkylene glycol copolymer according to claim 1, wherein the temperature for the melting-reaction is in the range of 160-250° C.

* * * * *